United States Patent [19]

Blackmon et al.

[11] Patent Number: 4,986,346
[45] Date of Patent: Jan. 22, 1991

[54] MOVING BELT RADIATOR HEAT EXCHANGER

[75] Inventors: James B. Blackmon, Irvine; Edwin C. Cady, Orange; Nelson E. Jones, Huntington Beach, all of Calif.

[73] Assignee: McDonnell Douglas Corporation, Long Beach, Calif.

[21] Appl. No.: 318,757

[22] Filed: Mar. 3, 1989

[51] Int. Cl.$^5$ .............................. B64G 1/50; F28F 5/02
[52] U.S. Cl. ........................................ 165/86; 165/6; 165/41; 244/163
[58] Field of Search ................ 165/41, 86, 6; 244/163

[56] References Cited

U.S. PATENT DOCUMENTS 1,963,432  11/1933  Hoffman ............................ 165/6
3,158,198  11/1964  Hunter, Jr. ........................ 165/86
4,603,731  8/1986   Olsen ................................ 165/41

FOREIGN PATENT DOCUMENTS 706764  4/1954  United Kingdom ................ 165/86

OTHER PUBLICATIONS

NASA Technical Memorandum 100909, Moving Belt Radiator Development Status, K. Alan White, Jul., 1988.

Primary Examiner—Albert W. Davis, Jr.
Attorney, Agent, or Firm—Curt L. Harrington; George W. Finch; John P. Scholl

[57] ABSTRACT

A rolled belt heat exchanger utilizes the increased heat transfer due to a large, extended surface belt. Heat is transferred from a heated roller to the belt, and then allowed to radiate to space as the belt follows a generally flattened oval path away from the heated roller.

12 Claims, 5 Drawing Sheets

MOVING BELT RADIATOR HEAT EXCHANGER

BACKGROUND OF THE INVENTION

In systems producing large amounts of waste heat as a by-product of a necessary process, a method for efficiently removing such waste heat is highly desirable. This need is particularly acute for space systems wherein large amounts of heat are generated as a by product of space system operation. The weight limitation accompanying space designs dictates a lightweight, efficient device for eliminating waste heat.

Numerous advanced radiator concepts have been proposed as potential improvements for space power systems. Only a select few of these appear to be feasible for the large advanced space power systems. In addition to satisfying the generalized requirements of space power systems, the radiator must avoid single-point failure modes; interface with the relatively high temperatures of the power conversion system; have compact stow capability; and offer a significant decrease in total system mass, while operating in a hostile environment.

Current systems for heat rejection in space rely primarily on the proven heat pipe radiator. Evolutionary improvements in heat pipe radiators should increase survivability and provide compact stow capability. Design improvements to enhance heat transfer and condensate flow should decrease radiator specific weight and extend the operating regime to higher heat fluxes. However, these potential improvements are limited when both survivability and decreased system weight goals are prescribed. In addition, heat pipe concerns include (1) susceptibility to directed energy, including effects of heat transfer fluid loss, (2) noncondensible gas formation over the 10-year life, and (3) total system mass of large-scale systems, especially when provided with protection barriers.

SUMMARY OF THE INVENTION

Although heat pipe radiators are proven and viable baseline candidate systems, their limited capability for system weight improvement has prompted interest in more novel concepts. The most notable answer to both the weight and heat transfer problem is the moving dry belt radiator. The moving belt radiator concept can also meet requirements of high-acceleration maneuvering, stowage in the shuttle cargo bay, practical deployment and erection, and long life. The moving belt radiator offers excellent survivability. The moving belt radiator has a significant conceptual design maturity and a supporting technology base. The evaluation of the dry moving belt offers the most reliable performance under the conditions required by the advanced space power systems.

The new moving belt radiator concept offers a pragmatic approach to achieving enhanced heat rejection and potentially low system weights compared with heat pipes and offers several design improvements over previous moving belt radiator design configurations, including ease of deployment/stowage and enhanced performance. It also has a greater degree of survivability than heat pipes. The moving belt radiator performance is quite testable in a 1-g environment under conservative conditions, thus reducing technical risks associated with system implementation.

The moving belt radiator of the present invention can be custom designed to meet particular user requirements. Some of these design criteria include overall configuration, especially (1) the drum-to-belt heat exchanger design and (2) the contact resistance between the drum and belt. The dry belt configuration and the use of a high temperature lubricant between the drum and belt offer a novel solution to both the configuration and contact resistance while providing a noncontaminating, easily deployed compact-stow design.

BRIEF DESCRIPTION OF THE DRAWING

The structure and method of operation of the invention, together with additional advantages thereof, will be best understood from the following description of specific embodiments when read in connection with the accompanying drawings, in which.

DETAILED DESCRIPTION OF THE PREFERRED EMBODIMENT

Figure 1:
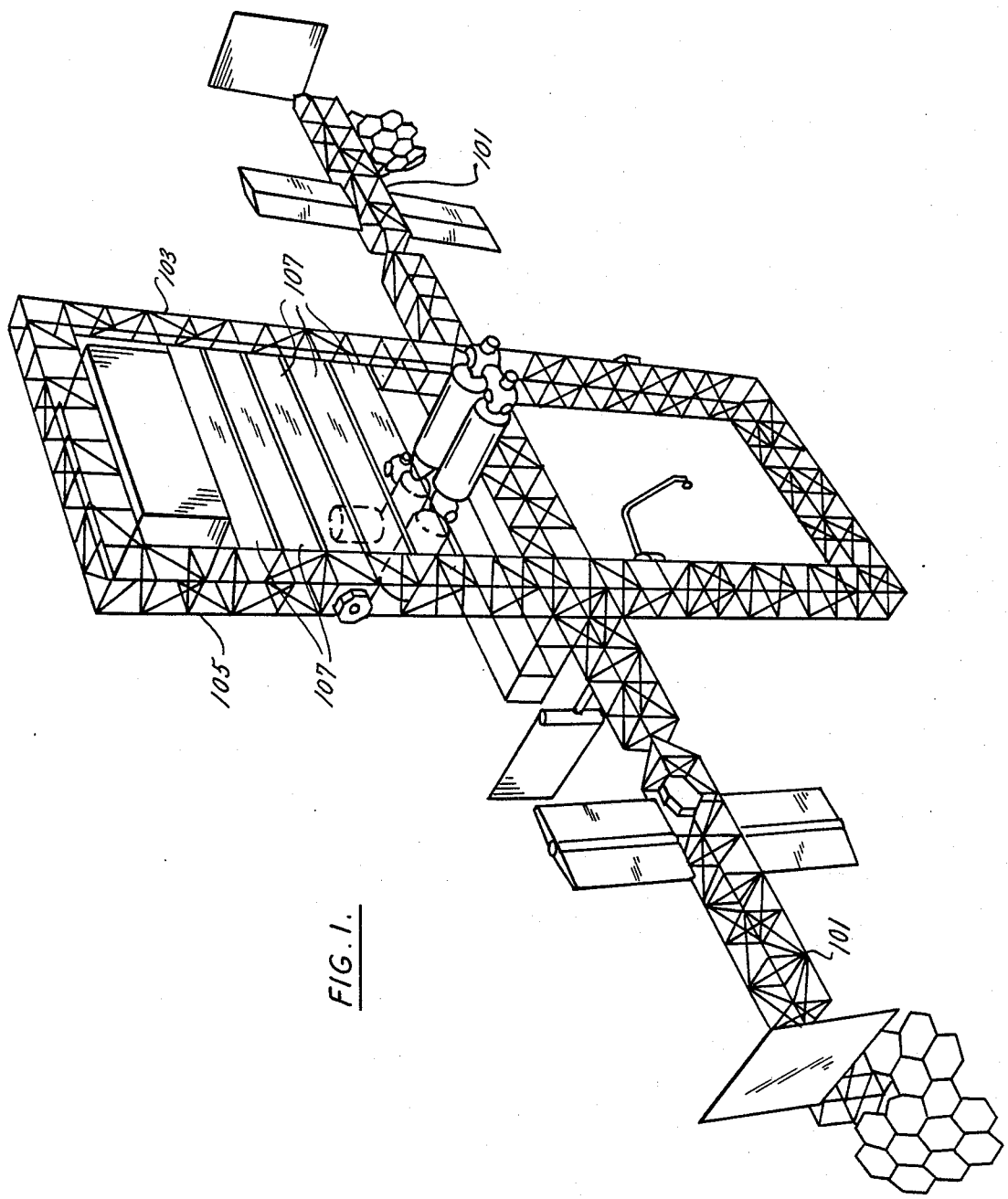
FIG. 1 is general illustration of a space station type structure with the moving belt radiator heat exchanger of the present invention operationally in place.

Referring to FIG. 1, there is shown an isometric view of a space structure with the moving belt radiator heat exchanger of the present invention operationally attached. A space station 101 is made up of structural members supporting various types of devices necessary for operation in the space environment. Between a structural member 103 and a structural member 105 is suspended a length of radiator belt 107. One side of the length of radiator belt 107 is shown, the other side of radiator belt 107 exposed rearward with respect to space station 101.

Figure 2:
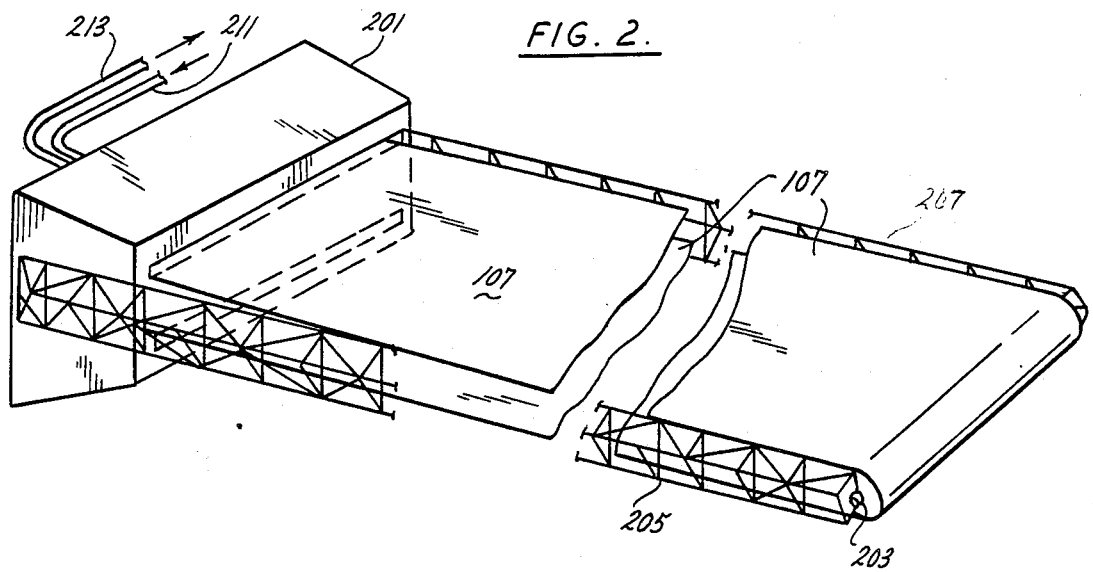
FIG. 2 is illustrates a more detailed description of the moving belt radiator heat exchanger of FIG. 1.

Referring to FIG. 2, an enlarged illustration of the radiator belt of FIG. 1 is shown with a slightly different method of suspension. Radiator belt 107 is suspended between a radiator belt housing 201 and a remote roller 203. The remote roller 203 is suspended away from the radiator belt housing 201 by a near view structural member 205 and a far view structural member 207 situated parallel to the structural member 205. Structural members 205 and 207 are attached to radiator belt housing 201 and to remote roller 203.

An incoming fluid transfer line 211 and an outgoing fluid transfer line 213 are connected to the radiator belt housing 201. The radiator belt housing 201 and the remote roller 203 rollably continuously support radiator belt 107, allowing the heated radiator belt 107 to travel to and from the radiator belt housing 201 as it radiates heat into space. Within the radiator belt housing 201, radiator belt 107 receives heat supplied to the radiator belt housing 201 through the fluid transfer lines 211 and 213.

Figure 3:
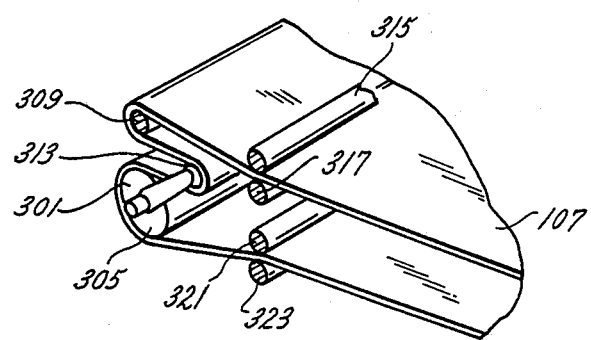
FIG. 3 is a closeup detail of the roller and belt retractor of the moving belt radiator heat exchanger of FIG. 2.

Referring to FIG. 3, a more detailed illustration of the apparatus within radiator belt housing 201 of FIG. 2 is shown. A housing roller 301 provides the central support for radiator belt 107. Housing roller 301 supplies the heat to radiator belt 107 and may supply a part or all of the turning force necessary to drive radiator belt 107.

Six other rollers can be used to tension and/or drive radiator belt 107. A tension control roller 303 is attached to housing roller 301 by means of a belt retractor 305. A tensioning roller 309 is parallel to tension control roller 303. Tensioning roller 309 is positioned to tensionally oppose the action of tension control roller 303 in tightening the tension upon radiator belt 107.

A pinch roller 315 and a pinch roller 317 compress radiator belt 107 on its upper surface. Similarly, a pinch roller 321 and a pinch roller 323 compress radiator belt 107 on its lower surface.

The configuration of FIG. 3 is applicable to both the embodiment of FIGS. 1 and 2. Note that FIG. 2 illustrates an embodiment wherein radiator belt 107 is extended from a structure and thus provides its own support. The embodiment of FIG. 1 illustrates the case wherein the radiator belt 107 is suspended between two structures which are otherwise used to support the space station 101 itself.

Figure 4:
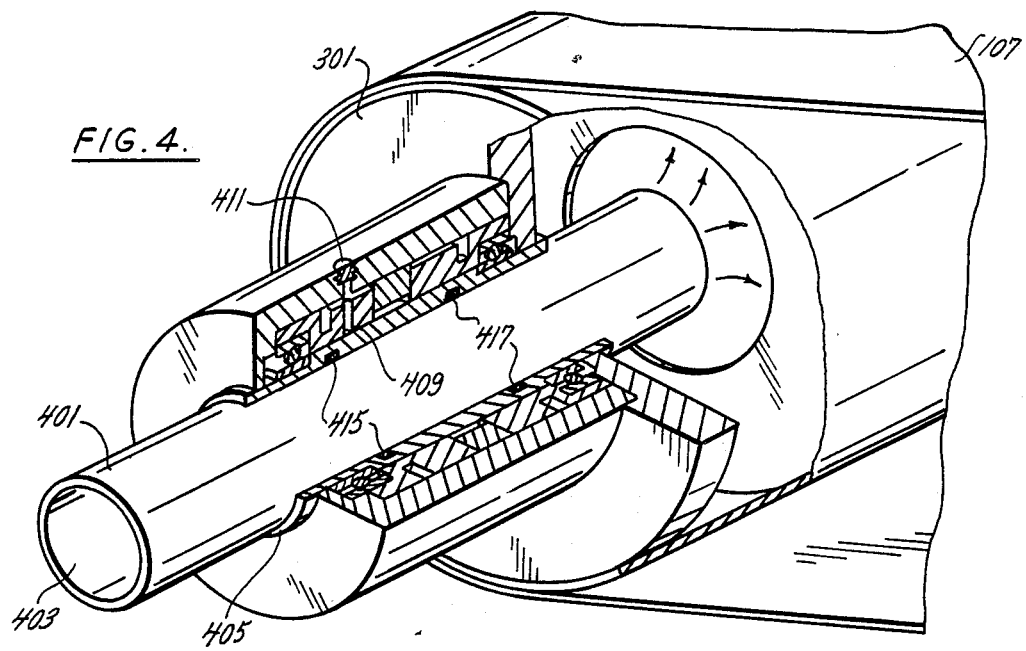
FIG. 4 is a detailed illustration of the roller and bearing internals of the moving belt radiator heat exchanger of FIGS. 2 and 3.

Referring to FIG. 4, the particulars of the housing roller 301 are illustrated. Housing roller 301 is supported by an axle 401 having an aperture 403 shown in the near end. Aperture 403 is used to admit the heat transfer fluid into housing roller 301 for heat transfer to radiator belt 107.

Axle 401 is rotatably supported by a bearing 405. Bearing 405 is supported by a support 407. Support 407 holds lubrication fluid and is filled by a fill hole 409. Fill hole 409 is capped with a plug 411. Axle 401 receives sealing assistance from a pair of "o" rings 415 and 417.

The structure of the invention helps to minimize heat transfer fluid loss via the radiator belt 107 and housing roller 301 as a heat exchanger. With the high rejection temperatures used by the advanced power conversion systems, fluid loss for moving belt radiator systems must be minimized. The rotary seals can be used with liquid metals. The coolant, such as commercially available coolants sold under the trade names DC-705, Nak, as well as liquid lithium, will transfer heat from the drum to the belt through contact conductance.

Figure 5:
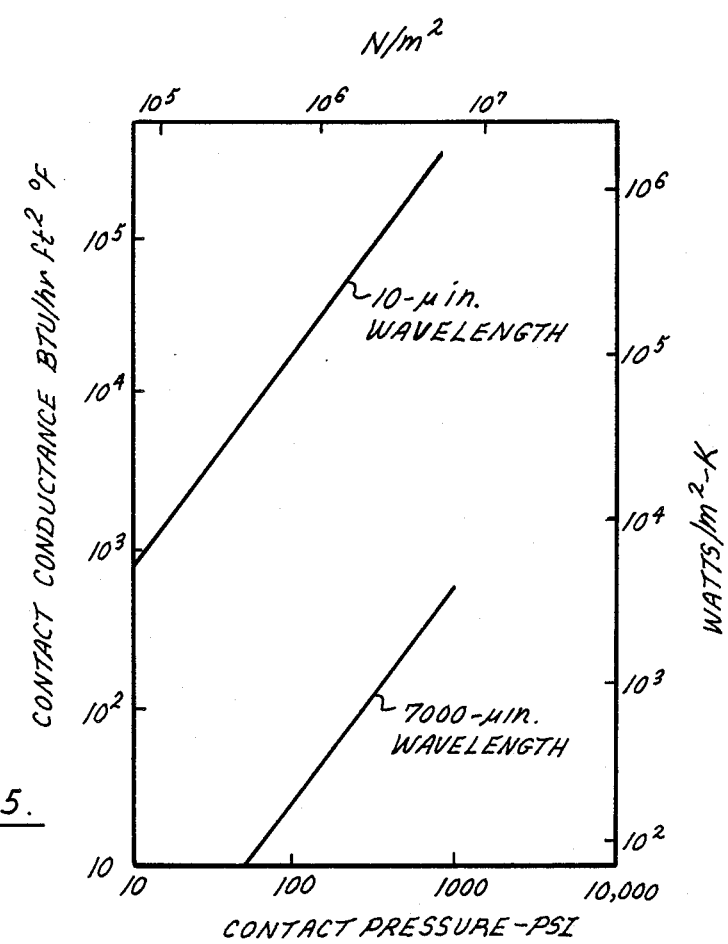
FIG. 5 is a graph illustrating the conductance of the belt material as a function of contact pressure for the moving belt of the moving belt radiator heat exchanger of FIG. 2.

The heat given up by the radiator belt 107 will be directly proportional to the heat transferred to it. The heat transferred to the radiator belt 107 is dependent upon the tension of the radiator belt 107 on the housing roller 301 and the remote roller 203. FIG. 5 is a graph of the intensity of heat lost from the belt as a function of belt tension. Two frequencies of radiative heat were measured. At the upper left portion of the graph the emission rate line for the 10 microinch wavelength is illustrated. At the lower portion of the graph the emission rate line for the 7000 microinch wavelength is illustrated.

High values of contact conductance are essential so that the overall heat transfer is acceptable. The contact conductance varies with the contact pressure and the distribution of asperities (wavelength between high points), as shown in FIG. 5. For well polished metals with surface roughness of the order of 10 microinch, the wavelength was of the order of 7000 microinch requiring contact pressures of the order of 1000 psi to achieve acceptable conductance. However, radiator belts 107 of reasonable thickness, such as about one millimeter cannot be stretched hard enough to exert such pressures without exceeding the strength of the belt material. Radiator belts 107 may operate best at tensions on the order of 100 psi. Such a low contact pressure would result in less contact conductance and less heat transfer.

At least two methods may be used to increase the contact conductance. The first is to reduce the wavelength between asperities to a distance of the order of the height of the asperities (e.g., 10 micro in). This will increase the contact conductance to the order of 20,000 Btu/hr-ft$^2$ - degree F. at a contact pressure of 100 psi. This technique would be facilitated by very fine shot peening or grit blasting the housing roller 301 and radiator belt 107 surfaces The second method involves the coating of the drum with a lubricant to improve the contact conductance. Because of the high temperatures and vacuum environment, only a few lubricants are practical. The best lubricant available is tungsten disulfide ($WS_2$) applied to the drum in a very thin layer of about 20 microinches. If the effective conductivity of ($WS_2$) can be maintained at least equivalent to that of air, the contact conductance will be increased to the order of 35,000 Btu/hr-ft$^2$-° F.

Such high conductance means that the limiting resistance will be the fluid heat transfer to the housing roller 301 and conduction through the drum wall. The housing roller 301 size and wall thickness will be configured for optimum system weight. The inside of the housing roller 301 will be configured to reduce the fluid convection characteristic dimension and obtain an overall heat transfer coefficient of the drum system of the order of 1000-2000 Btu/hr-ft$^2$-° F. The advantage of this configuration is that high drum-to-belt contact pressures would no longer be required, thus requiring smaller support members to support the radiator belt 107 which will result in decreasing the system weight.

Figure 6:
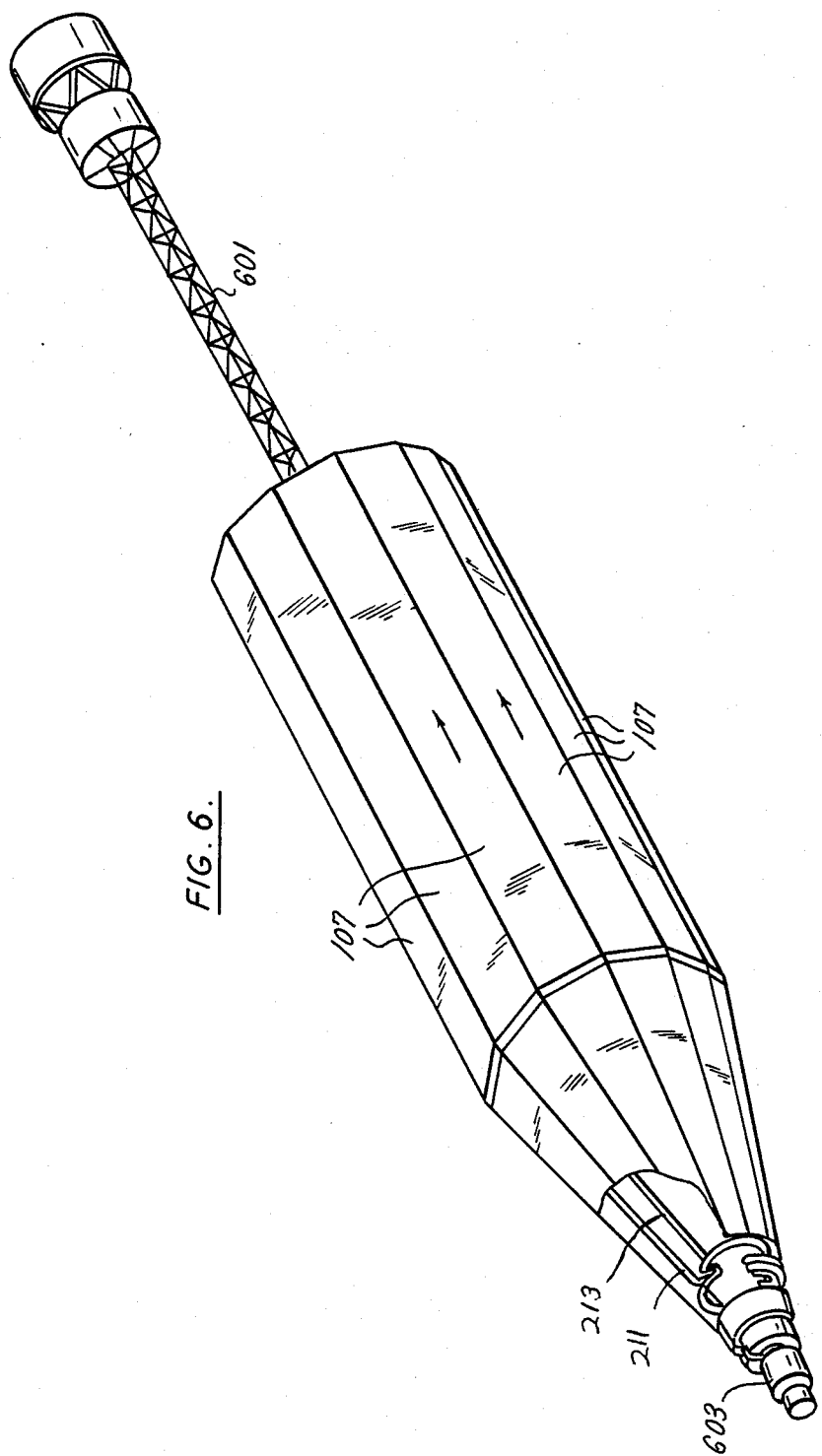
FIG. 6 is an illustration of an alternative operational embodiment of the moving belt radiator heat exchanger of FIGS. 2, 3, and 4.

Yet another possible configuration for the moving belt radiator heat exchanger system of the present invention is illustrated in FIG. 6. Here a series of radiator belts 107 are oriented longitudinally with respect to a space structure 601. Heat is generated near a power source 603. Fluid transfer line 211 and an outgoing fluid transfer line 213 are illustrated as extending to the radiator belts 107. Radiator belts 107 revolve outwardly away from the heat source radiating the majority of the heat away from space structure 601 when the radiator belts 107 are at peak temperature.

Figure 7:
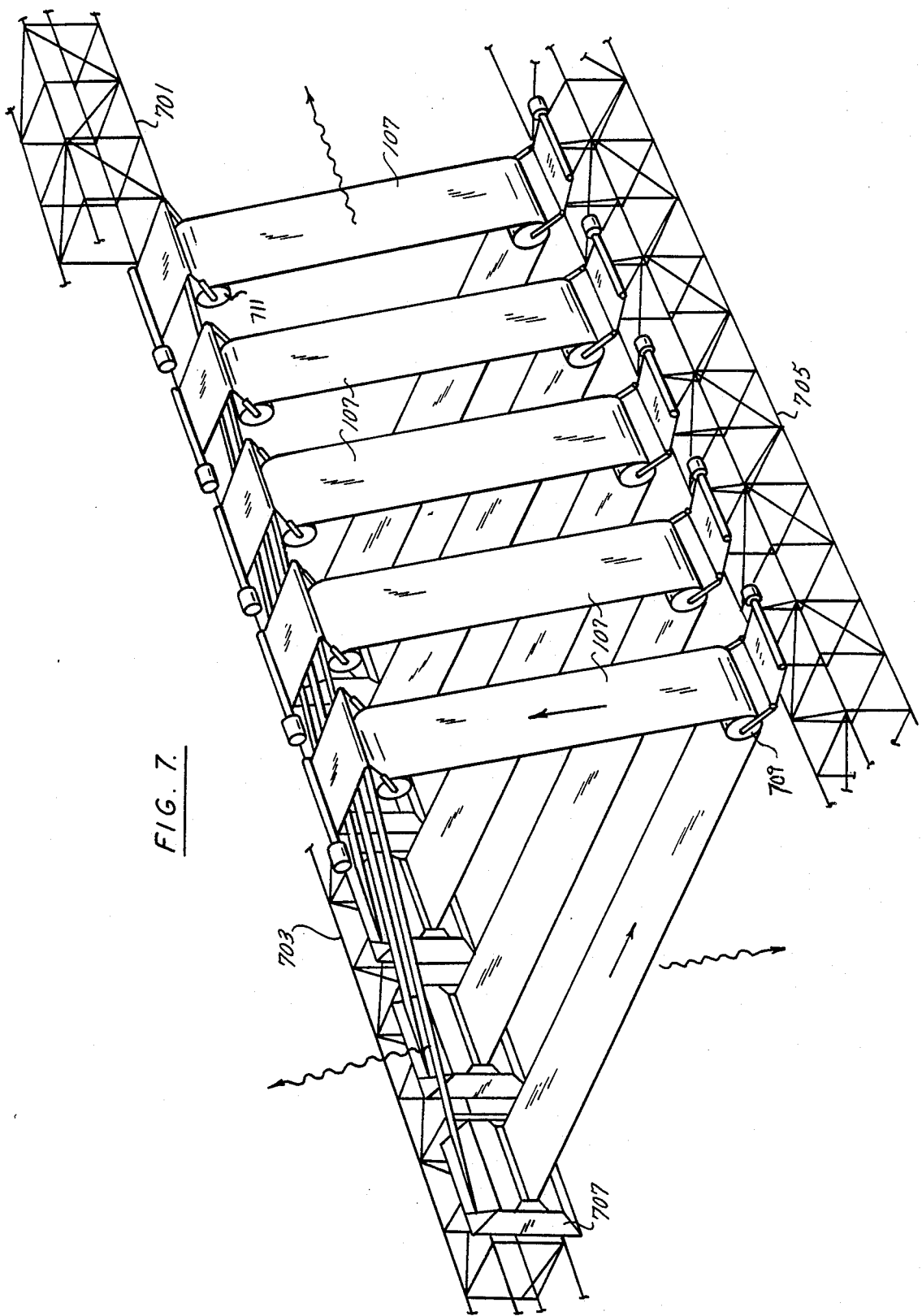

Another possible configuration for the moving belt radiator heat exchanger system of the present invention is illustrated in FIG. 7. Here a series of radiator belts 107 are oriented in a triangular fashion between three triangularly oriented structural members 701, 703, and 705. A series of radiator belt housings 707, similar to radiator housing 201 of FIG. 2, is located on structural member 703. The radiator belts 107 are supported away from radiator belt housing 707 by means of remote rollers 709 and 711. Arrows illustrate the direction of travel of radiator belts 107; although in the configuration of FIG. 7, either direction of travel would be acceptable.

The principal operational sequences for the moving belt radiator of the present invention on a space structure include stowage, deployment, dynamic control, start-up, shutdown, and nominal operating control. Critical sequences include shutdown during maneuvering and high temperature heat rejection from nominal operation.

As was shown in FIG. 3, the belt can be coiled compactly around housing roller 301 during stowage for launch. It can be retracted to stowed position at any time after deployment. As many moving belt radiator modules as are required to effectively reject heat from the power system may be employed. Although the dimensions of the moving belt radiator system may be adjusted to meet particular needs, a radiator belt 107 of approximately 1 meter in width rolled over about a 0.7 m housing roller 301 and remote roller 203 works well.

A "seat belt" type of winder may be used to coil the belt during stowage. This technology appears to be easily scalable to the moving belt radiator size and has the advantage of eliminating the possibility of tangling, since the belt is rolled or unrolled under controlled tension.

As shown in FIG. 2, each module can be deployed by unreeling the near view structural member 205 and far view structural member 207 along each edge of the moving belt radiator belt 107. Structural members 205 and 207 are rigid when extended, lightweight and retractable. They may be fitted with prestressed longerons that snap into place when the spar is unreeled. In their stowed position, the structural members 205 and 207 may be coiled in a spiral within a metal canister.

Their deployment may be controlled by a geared motor which gradually releases a restraining cable that controls the length of the extended structural members 205 and 207. The same cable can be pulled in to retract the spar. Structural members 205 and 207 have worked well at a 30 meter length. Radiator belt 107 would be drawn out as the structural members 205 and 207 are extended and pulled along between the ends of the two structural members 205 and 207. It is therefore evident that the moving belt radiator of the present invention may be deployed in space without any assembly occurring in space. It can just as easily be retraced and extended again at a later time, if needed.

The alternative design, shown in FIG. 6 can use idler pulleys attached to cables. The radiator belts 107 may be winched to spacecraft structural support positions some distance from the heat transfer drum assembly.

The radiator belt 107 is a thin sheet of material that must be held under tension to avoid fluctuations in the separation of its two halves and to maintain good thermal contact with the heat transfer drum. Its position on the housing roller 201 and remote roller 203 needs to be controlled in order to keep it centered. Tension controls can be maintained by the action of the structural members 205 and 207 to continue to extend. Secondary tension controls may be provided by a tensioning roller positioned between the pinch rollers 315 and 317, or between the pinch rollers 321 and 323 and the housing roller 301, all shown on FIG. 3.

Alternatively, if the present invention as shown in FIG. 5 is used, the tensioning can be provided by the remote rollers 709 and 711. However, the "pinch" roller concept of FIG. 3 appears to provide the lower weight approach since the total force required for good thermal contact between the radiator belt 107 and housing roller 301 could be high.

During normal orbital dynamics, including attitude adjustments, reorientation of the spacecraft, the belt tension controls will be more than adequate to prevent belt flapping. In the case of a structural member-extended belt, the structural members 205 and 207 are constructed rigidly enough to resist these same forces. It would however be unrealistic to consider any large radiator structure as capable of resisting rapid accelerations of the sort required for evasive maneuvers. The moving belt radiator of the present invention can be fully or partially retracted to make it more rigid and less subject to damage during such excursions.

Housing roller 301 and fluid transfer lines 211 and 213 may be preheated before starting the moving belt radiator. In the case of liquid metal and other freezable coolants, preheating is essential to allow flow to proceed. In other cases, heating will decrease the viscosity to the point where normal flow rates are possible. The radiator belt 107 must also be in motion as soon as heat transfer from the drum commences, so that hot spots on radiator belt 107 do not develop. With high radiator belt 107 tension levels, overheating the belt material can push it close to the plastic limit where it would yield and damage the belt. Therefore, belt temperature should be continuously monitored and corrective actions should be taken to protect the belt by changing the belt speed or the coolant flow rate while maintaining good heat transfer.

Shutdown requires the reverse of this sequence. As the housing roller 301 cools, a free coolant passage must be maintained to allow this last amount of heat transfer; the coolant may be circulated through fluid transfer lines 211 and 213 at a reduced rate if a rapid restart is anticipated and to prevent solidification. The ease with which the moving belt radiator configuration can be stowed allows the system to respond to long term low power conditions. All of the radiator belts 107 would not have to be deployed, which decreases their exposure to the hostile environment of space.

Changes in the heat rejection rate and/or in the temperature of heat being rejected can be accommodated easily by the moving belt radiator, by varying the radiator belt 107 speed, the coolant flow speed, the tension of the radiator belt 107, and the number of radiator belts 107 extended to vary the total radiating area. This combination of variables offers a number of control options. The best options will depend on design optimization of the radiator/power system for minimum orbital mass, mission lifetime, reliability, and a variety of other possible criteria.

The moving belt radiator system disclosed herein will be effective in maneuvering environments, is efficient as a radiator, is easily stowed and deployed, and is durable enough to match the typical mission requirements. The moving belt radiator of the present invention uses compact, self-stiffening, easily stowed radiator belt design techniques, configurations for extending the useful moving belt radiator surface area, improvements in the moving belt radiator seals and wear characteristics, and enhanced high temperature heat transfer techniques between the radiator belt 107 and housing roller 301 in a compact, low mass design.

The support structure for the moving belt radiator should provide a practical means of deploying the belt, allow the belt to be retracted for compact stowage, minimize the structural weight associated with pulley systems which exert high force over the entire belt length to improve drum and belt thermal contact, and enhance the heat transfer to the radiator belt 107.

Heat pipe radiators may also be employed in conjunction with the present invention to move heat to the housing roller 301. The present invention can be used for waste heat rejection in space or any commercial process requiring heat transfer between liquids and gases. The invention features a compact stowage with retraction/deployment mechanism, enhanced thermal contact with compact pinch roller design, the use of high temperature belt lubricant to enhance heat transfer, and enhanced radiation heat transfer by use of idler pulley configuration to allow radiation from both sides of radiator belt 107.

In addition, the moving belt radiator system features opposing rollers pinch achieve good heat conduction without excessive belt tension and multiple rollers for providing contact over flat surfaces to minimizing bending. The ferro fluid seals prevent leakage with rotary seals. The seatbelt-type retractor used to stow and deploy belt with controlled bending is especially advantageous for space applications. The dry belt helps to prevents contamination.

The minimum tensile stresses on belt and good surface area to volume ratio enable efficient heat transfer. The controllability of the belt allows it to meet a wide range of thermal load conditions. The moving belt radiator design maximizes effective radiator area while minimizing the weight associated with multiple roller heat exchanger. The multiple unit design is redundant. Operational failures in one unit will not affect the other units.

The forgoing disclosure and description of the invention are illustrative and explanatory thereof, and various changes in the materials of construction, physical configuration, types of control,(e.g., electrical, mechanical, pneumatic, etc.) as well as in the details of the illustrated embodiments may be made without departing from the spirit and scope of the invention.

What is claimed is:

1. A heat rejection apparatus comprising:
   means for accepting the flow of a heated coolant fluid, including
      an incoming fluid transfer line and,
      an outgoing fluid transfer line;
   radiative means for radiating heat including
      a radiator belt having a generally smooth surface and formed into a loop to facilitate continuous movement over said rotatable roller;
      a remote rotatable roller having a first end and a second end, circularly surrounding the inner surface of said radiator belt, said remote roller creating tension in said radiator belt while urging said remote roller away from said rotatable roller; and,
   transfer means, in rotatable circular contact with said radiative means and attached to said means, for accepting, for transferring heat from said heated coolant fluid to said radiative means including a rotatable roller having a first end and a second end and a coaxial opening extending completely therethrough, said first end of said rotatable roller connected to and in fluid communication with said incoming fluid transfer line, said second end of said rotatable roller connected to and in fluid communication with said outgoing fluid transfer line.

2. The heat rejection apparatus of claim 1 further comprising:
   a first support member having two ends, one end of said first support member connected to said first end of said rotatable roller and the other end of said first support member connected to said first end of said remote rotatable roller; and,
   a second support member having two ends, one end of said second support member connected to said second end of said rotatable roller and the other end of said second support member connected to said second end of said remote rotatable roller.

3. The heat rejection apparatus of claim 2 further comprising an upper pair of tensionally opposing rotatable pinch rollers, one of said upper pair of pinch rollers on the outer side of said radiator belt, the other of said upper pair of pinch rollers on the inner side of said radiator belt, said tensional opposition of said upper pair of pinch rollers exerted against said radiator belt.

4. The heat rejection apparatus of claim 3 further comprising a lower pair of tensionally opposing rotatable pinch rollers, one of said lower pair of pinch rollers on the outer side of said radiator belt, the other of said upper pair of pinch rollers on the inner side of said radiator belt, said tensional opposition of said lower pair of pinch rollers exerted against said radiator belt.

5. The heat rejection apparatus of claim 4 further comprising a housing surrounding said rotational roller, said upper pair of pinch rollers and said lower pair of pinch rollers; said housing, said upper and lower pinch rollers, said first and second support members, said radiator belt, said remote rotatable roller, said rotatable roller, and said incoming and outgoing fluid transfer lines forms one radiative heat transfer unit.

6. A space station system embodying the heat rejection apparatus as recited in claim 5 and further comprising:
   means, between, and in surface contact with said rotatable roller and said radiator belt, for improving the heat transfer rate between said rotatable roller and said radiator belt.

7. A space station system embodying the heat rejection apparatus as recited in claim 6 wherein said means for improving the heat transfer rate comprises a thermally conductive lubricant.

8. A space station system embodying the heat rejection apparatus as recited in claim 5 and further comprising:
   a space station structure upon which is fixably mounted said engine means, said pump means, said rotatable roller, said housing and said first and second support members.

9. The space station system of claim 8 wherein said space station structure has a multiplicity of said radiative heat transfer units.

10. The space station system of claim 9 wherein said multiplicity of said radiative heat transfer units are mounted triangularly and said radiator belts assume a triangular orientation.

11. The space station system of claim 9 wherein said multiplicity of said radiative heat transfer units are mounted longitudinally along the structure of said space station and said radiator belts assume a collinear orientation.

12. The space station system of claim 9 wherein said multiplicity of said radiative heat transfer units are mounted longitudinally along the structure of said space station.

* * * * *